US012669804B2

(12) United States Patent
Walter et al.

(10) Patent No.: US 12,669,804 B2
(45) Date of Patent: Jun. 30, 2026

(54) APPARATUS, AUTOMATION SYSTEM AND METHOD FOR COUPLING A DEVICE NETWORK AND A COMMUNICATION NETWORK

(71) Applicant: Siemens Aktiengesellschaft, Munich (DE)

(72) Inventors: Maximilian Walter, Nuremberg (DE); Stephan Höme, Schwabach (DE); Harald Albrecht, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 426 days.

(21) Appl. No.: 18/342,978

(22) Filed: Jun. 28, 2023

(65) Prior Publication Data

US 2024/0019846 A1      Jan. 18, 2024

(30) Foreign Application Priority Data

Jul. 1, 2022     (EP) ..................................... 22182566

(51) Int. Cl.
*G05B 19/4155*          (2006.01)
(52) U.S. Cl.
CPC .................... *G05B 19/4155* (2013.01); *G05B 2219/31368* (2013.01)

(58) Field of Classification Search
None
See application file for complete search history.

(56) References Cited

U.S. PATENT DOCUMENTS

2013/0253706 A1      9/2013  Hada et al.

FOREIGN PATENT DOCUMENTS

DE       102013102998        9/2013
EP         3051779           8/2016
EP         3051779 A1 *      8/2016   ......... H04L 61/5046
WO       2019141349          7/2019

OTHER PUBLICATIONS

Machine Translation of EP 3051779 A1 (Year: 2016).*
EP Search Report dated Dec. 16, 2022 based on EP22182566 filed Jul. 1, 2022.

* cited by examiner

*Primary Examiner* — Ryan A Jarrett
(74) *Attorney, Agent, or Firm* — Cozen O'Connor

(57) ABSTRACT

Automation system, apparatus and method for coupling a device network and a communication network, wherein the system verifies addressing of components in an automation system having a hyper-convergent infrastructure, where a gateway extends data telegrams to include a device-specific signature if such a signature cannot be implemented by the automation device of the automation system itself.

10 Claims, 4 Drawing Sheets

START

Sign and Send
Data Telegram                    —710

Verify
Signed Data Telegram            —720
Remove Signature
and Send

END

APPARATUS, AUTOMATION SYSTEM AND METHOD FOR COUPLING A DEVICE NETWORK AND A COMMUNICATION NETWORK

BACKGROUND OF THE INVENTION

1. Field of the Invention

The present invention relates to an automation system, in particular an automation system comprising a plurality of groups of automation devices, an apparatus and method for coupling a device network and a communication network and, more particularly, to a method for coupling of a device network comprising at least one automation device to a communication network comprising a control apparatus for the at least one automation device.

2. Description of the Related Art

Automation systems are widely used for industrial applications. An example of such automation systems are programmable logic controllers (PLCs). Here, a plurality of automation devices can be coupled to a control apparatus via a data link. The control apparatus can receive parameters such as measured variables and/or sensor values, from the automation devices and send control commands to the automation devices. It is extremely important that the control apparatus is able to associate the received data with a correct automation device and that the control commands from the control apparatus are executed by the intended automation device. The addressing of the individual components and also the checking that the received data has actually been received by the correct component therefore assume major importance.

Safety-related communication protocols, in particular communication protocols per International Electrotechnical Commission (IEC) standard 61784-3, such as PROFIsafe, for example, use not only a network address for addressing a component, but also use "codenames" (CN) to detect addressing errors. These codenames are stored in both end points of a connection. However, when installing and configuring an automation system, care must be taken to ensure that a different codename is used for each connection. However, this involves considerable organizational overhead and is currently only supported to a limited extent. For example, because the codenames are 32 bits long, the available address space is very limited.

However, further enhancements to ensure correct addressing are currently only implemented in a small number of terminals and are therefore likewise only available to a limited extent.

In addition, as development progresses, control tasks in modern automation infrastructures are increasingly being combined in a central control hardware. For example, the processes of a plurality of control apparatuses for automation systems can be executed on a common central hardware. This approach promises, for example, a uniform software environment for operation and maintenance or software updating.

However, if control processes for a plurality of automation systems are executed on a central hardware, then this also makes it more challenging to ensure correct addressing of the individual automation devices and also to check that the addressing is correct.

SUMMARY OF THE INVENTION

In view of the foregoing, it is an object of the invention to provide an automation system and method for ensuring safe and reliable addressing of automation components in automation systems comprising conventional, existing and currently available automation components even when control is provided by a central hardware unit with a plurality of control processes.

This and other objects and advantages are achieved in accordance with the invention by an automation system, a method and apparatus for coupling a device network to a communication network, where the device network comprises at least one automation device. The communication network comprises a control apparatus for the at least one automation device. In particular, a plurality of control processes for automation devices in different device networks can be provided in the control apparatus. The apparatus for coupling the device network to the communication network comprises a first interface, a second interface, and a processing facility (processor). The first interface is configured to be coupled to the device network. The second interface is configured to be coupled to the communication network. The processing facility is configured to sign a data telegram from an automation device in the device network with a device-specific identifier and to send the signed data telegram to the control apparatus via the communication network. In addition, the processing facility is configured to verify a signed data telegram from the control apparatus using a device-specific identifier. The processing facility is also configured to remove the signature from the received signed data telegram and to send the data telegram, without the signature, to an automation device in the device network. The device-specific identifier comprises a predetermined identifier of a source device or destination device in the device network.

In accordance with an embodiment, a first automation system is provided, where the first automation system comprises a plurality of groups of automation devices, a control apparatus, and a plurality of apparatuses in accordance with the invention for coupling a device network to a communication network. Here, the automation devices of a group of automation devices are each interconnected via a separate device network. The control apparatus is configured to execute a plurality of control processes for the automation devices on a common hardware. A control process is provided for each of the automation devices of a group of automation devices. An apparatus for coupling a device network to a communication network couples each device network comprising a group of automation devices to the communication network. The control apparatus is connected to the plurality of apparatuses for coupling a device network to a communication network via a common communication network.

In accordance with another embodiment, a second automation system is provided, where the second automation system comprises a plurality of groups of automation devices, a control apparatus, and a plurality of apparatuses for coupling a device network to a control apparatus. The automation devices of a group of automation devices are each interconnected via a separate device network. The control apparatus is configured to execute a plurality of control processes for automation devices on a common hardware. A control process is provided for each of the automation devices of a group of automation devices. In addition, a processing instance is provided in the control apparatus for each control process. These processing instances are each configured to sign a data telegram from an automation device with a device-specific identifier and to forward the signed data telegram to the corresponding control process. In addition, the processing instances are each configured to check a signed data telegram from a control process using a device-specific identifier, to remove the signature of the signed data telegram, and to output the data telegram without the signature. The apparatuses for coupling a device network to a control apparatus are each configured to establish a secure connection to a processing instance of the control apparatus via a communication network and to exchange data telegrams between the respective device network and the corresponding processing instance of the control apparatus via the secure connection.

In this context, automation devices are understood as being all types of automation components that receive control commands from a control apparatus and then perform predetermined operations. The automation device can also transmit data, such as measured values, sensor data and/or a current status to the control apparatus. For example, the automation devices can also be a robotic arm or similar device. In addition, it should be understood any other types of automation devices are also possible.

In automation systems in which a plurality of automation devices are addressed by a common controller, correct addressing and reliable verification of the addressing of a received data telegram are of great importance for security reasons. Especially in hyper-convergent infrastructures, in which a plurality of control processes for different groups of automation devices are executed in a common central hardware, correct addressing and also verification of this addressing of received data packets constitutes a significant challenge.

Conventional concepts can only be applied with great difficulty, if at all, to automation systems having a central hardware that executes a plurality of control processes in parallel. In addition, the implementation of a plurality of control processes in a common hardware is currently still a relatively new concept. Therefore, relatively few hardware components currently exist in which advanced addressing and verification concepts are implemented.

In recognition of this, the central idea of the present invention is therefore to provide a concept for reliable addressing as well as verification of addressing, which can also be easily applied to already existing hardware of automation devices.

In addition to conventional addressing and an additional data element, the "codename" (CN), in advanced automation systems such as an extension of PROFIsafe, a further feature is provided that is also referred to as "BaseID", among other things. Here, an additional device-specific identifier, for example, a 64-bit number, is used to sign part of a data telegram in a device-specific manner. Because of the large value range of such a 64-bit number, multiple assignment of this identifier can be virtually eliminated. The identifier can be stored both in the control system or control process and in the device to be addressed. A sender, either the control system or the automation component, signs a data telegram or at least a data element of such a data telegram with this identifier. This identifier for the signature is device-specific, i.e. is selected individually for each automation component. As a result, the receiver can then use this signature to check whether the address corresponds to the device-specific signature and is thus assigned to the correct automation device.

However, as this is a relatively new concept, this method has not yet been implemented in all automation components and cannot therefore be put into practice, or only to a very limited extent, particularly in hyper-convergent infrastructures, i.e., in automation systems in which a central control apparatus executes a plurality of control processes for a plurality of different groups of automation devices.

In accordance with disclosed embodiments of the invention, the exchange of data is therefore implemented based on the above-described concept using device-specific signing of the addressing between the central control apparatus and a coupling apparatus between a communication network and a device network. For the further data path between the coupling apparatus and the automation devices, transmission of the data telegrams and verification of the addressing are performed in a conventional manner, as also implemented in existing system components. The coupling apparatus therefore serves here as a kind of gateway that adapts the data telegrams between the two networks and at the same time can add an extended signature to the data telegrams or remove the extended signature in order to make the data telegrams available for conventional automation devices.

The device networks are each comparatively small networks with a limited group of automation devices. Consequently, it is sufficient here to check the correct addressing based on conventional methods such as codenames or similar. On the other hand, for the area of the communication network in which a larger number of data telegrams are transmitted from a plurality of device networks to the central control component, the addressing can be improved based on the additional device-specific signature.

In accordance with one embodiment, the apparatus for coupling the device network to a communication network comprises a memory facility. This memory facility is configured to store and provide predetermined device-specific identifiers for automation devices in the device network. Thus, the apparatus for coupling the device network to the communication network can read out the corresponding device-specific identifier from the memory facility for each of the individual automation devices in the device network to sign a data telegram or to verify a signed data telegram. The memory facility can, for example, be written with the respective device-specific identifiers during configuration or commissioning of an automation system. In addition, automatic programming of the memory facility by the control apparatus is also possible, for example. The control apparatus can, for example, send special data telegrams or data packets to the apparatus for coupling the device network to the communication network in order to inform the apparatus of the corresponding device-specific identifiers. In addition, it should be understood any other concepts for storing the device-specific identifiers in the memory facility are also possible.

In accordance with another embodiment, signing a data telegram from the device network and removing the signature of a data telegram from the communication network involves an XOR operation between a predetermined data field and the device-specific identifier. Such an either-or (XOR) operation can preserve the original output value if this operation is applied twice. Thus, if a data element is first signed with such an XOR operation of the device-specific identifier, then the original output value can be obtained by applying this operation again using the same device-specific identifier. This provides a particularly simple method for signing or verifying the signature that can be implemented very quickly.

In accordance with another embodiment, the processing facility is configured to forward already signed data telegrams unchanged from the device network to the control apparatus via the communication network and to forward signed data telegrams unchanged to an automation device in the device network if the corresponding automation device is configured to process signed data telegrams. In other words, the processing facility forwards already signed data telegrams unchanged between the automation device and the control apparatus if the corresponding automation device itself is capable of processing signed data telegrams. Here, the processing facility can determine, in any manner, that the respective automation device can independently sign the data telegrams. For example, information about such an automation device can be stored in a memory.

In accordance with another embodiment, the processing facility is configured to encrypt a signed data telegram before it is sent to the control apparatus via the communication network. Similarly, the processing facility can also be configured to decrypt encrypted data telegrams from the control apparatus. In other words, communication between the apparatus for coupling the device network to the communication network, on the one hand, and the control apparatus, on the other, can be conducted over a secure, encrypted communication link. In this way, the security for correct addressing can be additionally increased, because in the event of an addressing error the receiver would not be able to decrypt the encrypted data correctly.

In accordance with a further embodiment, the data telegrams exchanged between the automation devices and the control apparatus comprise telegrams of a communication protocol per IEC 61784-3, such as PROFIsafe. In addition, it should be understood the concept in accordance with the invention can also be applied to any other automation systems and corresponding data telegrams.

Where expedient, the above embodiments and further developments can be combined with one another as required. Other embodiments, further developments and implementations of the invention also include not explicitly mentioned combinations of features of the invention described above or below with respect to the exemplary embodiments. In particular, persons skilled in the art will also add individual aspects as improvements or additions to the respective basics of the invention.

BRIEF DESCRIPTION OF THE DRAWINGS

Further features and advantages of the invention will now be explained with reference to the accompanying drawings, in which.

DETAILED DESCRIPTION OF THE EXEMPLARY EMBODIMENTS

Figure 1:
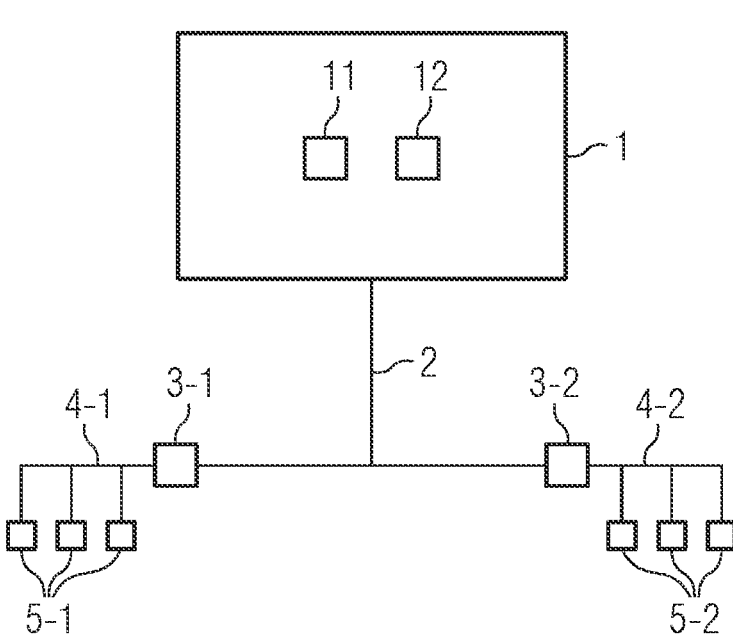
FIG. 1 schematically illustrates an automation system in accordance with an embodiment.

FIG. 1 shows a schematic representation of a schematic circuit diagram of an automation system in accordance with one embodiment. The automation system comprises a control apparatus 1. In addition, a plurality of automation devices 5-1, 5-2 are provided in the automation system. The automation devices 5-1 and 5-2 are each assigned to one of a plurality of groups of automation devices. In the illustrated example, the automation device 5-1 is assigned to the first group of automation devices and the automation device 5-2 is assigned to the second group of automation devices. It should be understood the two groups of automation devices 5-1 and 5-2 illustrated are to be regarded as only exemplary. It should be understood any number of groups of automation devices is also possible. Also, any number of automation devices can be provided in each group of automation devices.

A separate control process 11, 12 is provided in the control apparatus 1 for each group of automation devices 5-1, 5-2. Each of these control processes 11, 12 can generate control commands for a group of automation devices 5-1 and 5-2 respectively, and receive data from the automation devices 5-1 and 5-2 respectively, on the basis of which the control commands can be generated.

For data exchange between the automation devices 5-1, 5-2 and the control apparatus 1, the control apparatus 1 is connected to a communication network 2. The communication network 2 can be any communication network of an IT infrastructure. For example, communication network 2 can be an Ethernet network or similar. In addition, any other suitable communication network is also completely possible.

The automation devices 5-1 of a first group of automation devices are connected to a first device network 4-1, and the automation devices 5-2 of a second group of automation devices are connected to a second device network 4-2. The device networks 4-1, 4-2 can be networks that conform to the respective communication standard of the automation devices 5-1, 5-2. For example, the device networks 4-1 and 4-2 can be configured as PROFIbus networks. It is understood that a suitable network can be provided, depending on the choice of the automation devices 5-1 or 5-2.

The device networks 4-1, 4-2 are connected to the communication network 3 via a respective apparatus 3-1, 3-2 for coupling a device network to a communication network.

The apparatuses 3-1, 3-2 for coupling the device networks 4-1, 4-2 to the communication network 2 can be regarded here as a kind of gateway. In this case, data telegrams are sent from the control apparatus 1 via the respective apparatus 3-1, 3-2 to one of the automation devices 5-1, 5-2. Conversely, data telegrams can also be sent from the automation devices 5-1, 5-2 via the respective apparatuses 3-1, 3-2 to the control apparatus 1. Here, it is essential that the data telegrams sent out by the control apparatus 1 are actually received by the correct automation device 5-1, 5-2. Likewise, it is important that the data telegrams sent out by the automation devices 5-1, 5-2 are assigned to the correct automation device 5-1, 5-2 by the control processes 11, 12 in the control apparatus 1. For this purpose, correct addressing must be ensured and, if possible, checked.

For example, a "codename" (CN) is provided in automation systems compliant with the PROFIsafe standard to ensure correct addressing. However, due to the limited value range of these codenames and the significant administrative overhead, this feature will not be discussed further here.

In addition, an extension of PROFIsafe provides, for example, an additional feature referred to as "BaseID". This is an individual device-specific identifier that can be stored, on the one hand, in the automation devices 5-1 or 5-2 and, on the other hand, in the corresponding control processes 11, 12 of the control apparatus 1. For example, this device-specific identifier can be stored in a permanent memory of the automation device 5-1, 5-2. If necessary, it is also possible to store this device-specific identifier on a memory element of a separate component. Thus, when an automation device 5-1, 5-2 is replaced, this separate component can be inserted in the newly installed component in order to enable the previous device-specific identifier to be used in the new device. In this way, the device-specific identification can be very easily transferred in the event of servicing, thereby eliminating the need to reprogram the automation device.

Figure 2:
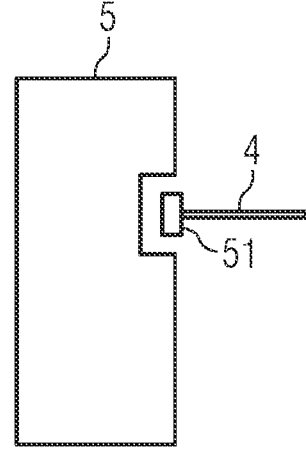
FIG. 2 schematically illustrates an automation device having an external data element for providing a device-specific identifier in accordance with an embodiment.

FIG. 2 shows by way of example a schematic representation of an automation device 5 having a separate component 51 in which the device-specific identifier can be stored. For example, this separate component 51 can be provided in the area of a plug-in connection for connecting the automation device 5 to a device network 4. Thus, the separate component 51 can remain on the connection component of the device network 4 when the plug-in connection is pulled and can be inserted in a new automation device 5 to be installed together with the connection component of the device network 4.

However, because the use of such device-specific identifiers is not currently implemented in all automation devices 5-1, 5-2, and because, for the foreseeable future, numerous automation devices 5-1, 5-2 will still be used without such an implementation, the concept of such device-specific identifiers can be transferred to the apparatuses 3-1, 3-2 described earlier for coupling a device network 4-1, 4-2 to a communication network 2.

Figures 3, 4:
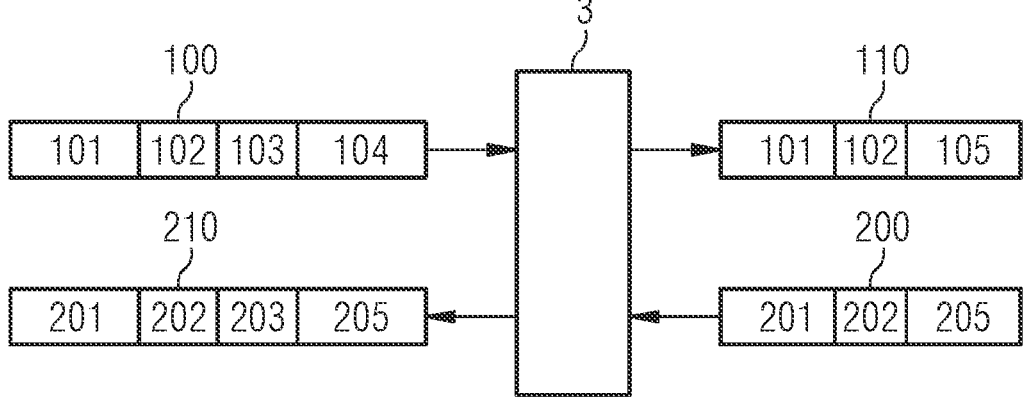
FIG. 3 schematically illustrates an apparatus for coupling a device network to a communication network in accordance with an embodiment.
FIG. 4 schematically illustrates an adaptation of data telegrams between a device network and a communication network in accordance with an embodiment.

FIG. 3 shows a schematic representation of an apparatus 3 for coupling a device network 4 to a communication network 2, such as can be used in the automation system described above. The apparatus 3 can have a first interface 31 with which the apparatus 3 can be connected to a device network 4. Similarly, a second interface 32 can be provided via which apparatus 3 can be connected to the communication network 2. A processing facility 33 (processor) is provided between the two interfaces 31, 32. The operation of this processing facility 33 is explained in more detail subsequently.

If the apparatus 3 receives a data telegram from an automation device 5-2, the device-specific identifier concept already having been implemented in the corresponding automation device 5-1, 5-2, the apparatus 3 forwards such a data telegram to the control apparatus 1 via the communication network 2. Similarly, the apparatus 3 can also forward data telegrams from the control apparatus 1 to an automation device 5-1, 5-2 if the device-specific identifier concept is already implemented in said automation device 5-1, 5-2.

If, on the other hand, the apparatus 3 receives from the control apparatus 1 a data telegram for an automation device 5-1, 5-2 in which the device-specific identifier function is not implemented, then the apparatus 3 can first verify such a data telegram using a device-specific identifier stored for such an automation device 5-1, 5-2 and adapt the data telegram such that it can be processed by the addressed automation device 5-1, 5-2.

Accordingly, the apparatus 3 can also receive a data telegram from an automation device 5-1, 5-2 and adapt such a data telegram using a device-specific identifier stored for said automation device 5-1, 5-2 and then send it to the control apparatus 1 via the communication network 2.

FIG. 4 shows a schematic illustration of the processing of data telegrams in an apparatus 3 in the event that the device-specific identifier concept is not implemented in the corresponding automation device 5-1, 5-2.

The upper line shows the data communication from the control apparatus 1 to an automation device 5-1, 5-2. The bottom line shows the data communication from an automation device 5-1, 5-2 to the control apparatus 1.

A data telegram 100 from the control apparatus 1 can typically include, in addition to the user data 101, a status/control byte 102 and a data sequence 103 modified in accordance with the device-specific identifier for the addressed automation device 5-1, 5-2. The data telegram 100 can also contain a checksum or hash value 104.

When such a data telegram 100 is received, the processing facility 33 first checks the integrity of this data telegram using the checksum 104. If this checksum is not correct, then the corresponding data telegram can be discarded. If the checksum is correct, then the data telegram is modified using the device-specific identifier for the addressed automation device 5-1, 5-2. Here, for example, the data sequence 103 modified in accordance with the device-specific identifier can be traced back to a data sequence from which the device-specific identifier was removed. Thus, this data sequence can be used to verify correct addressing in the destination automation device 5-2. The apparatus 3 then sends the destination automation device 5-1, 5-2 a data telegram 110 which, in addition to the user data 101 and the status/control byte 102, also contains the data sequence 105 from which the device-specific identifier has been removed. If a correct device-specific identifier according to the addressing was used in this process, then the automation device 5-1, 5-2 can perform a successful check based on this data sequence 105. If the data sequence 105 fails this check, then this may also be due to an addressing error. In this case, the automation device 5-1, 5-2 can reject this data telegram 110.

If the apparatus 3 for coupling a device network to a communication network receives a data telegram from an automation device 5-1, 5-2 for which no device-specific identifier is implemented, then this device-specific identifier can be added by the apparatus 3 before such a data telegram is sent to the control apparatus 1. As shown in the lower part of FIG. 4, such a data telegram 200 can, for example, include an additional data sequence 205 in addition to the user data 201 and a status/control byte 202. The processing facility 33 of the apparatus 3 can then determine a device-specific identifier for the automation device 5-1, 5-2 which has sent such a data telegram and modify the data telegram 200 accordingly. For this purpose, for example, the data sequence 205 can first be modified in accordance with the device-specific identifier. In addition, a checksum or hash value 204 can be calculated. From this, the processing facility 33 can generate a data telegram 210 which, in addition to the user data 201 and status/control byte 202, includes in a further segment 203 the modified data sequence 205, and in yet another segment 205 the checksum or hash value. This data telegram 210 can be sent to the control apparatus 1 via the communication network 2.

Thus, by modifying a data element, for example, the data sequence 205, via the device-specific identifier, the respective data telegram can be signed. Likewise, such a signature can be verified using this device-specific identifier. In one implementation, for example, an either-or operation (XOR) can be applied to the data element to be signed using the device-specific identifier. By applying such an XOR operation again with the same specific identifier, the original output data can then be obtained.

The device-specific identifiers for automation device 5-1, 5-2 can be stored, for example, in a memory 34 of the apparatus 3. For example, the device-specific identifiers can be written to the memory 34 during installation or configuration of the automation system by a user. However, in addition, any suitable automatic or semi-automatic methods for storing the device-specific identifier in the memory 34 of the apparatus 3 are also possible. For example, the control apparatus 1 can transmit the device-specific identifiers to the apparatus 3 by means of appropriate data packets via the communication network 2.

Figure 5:
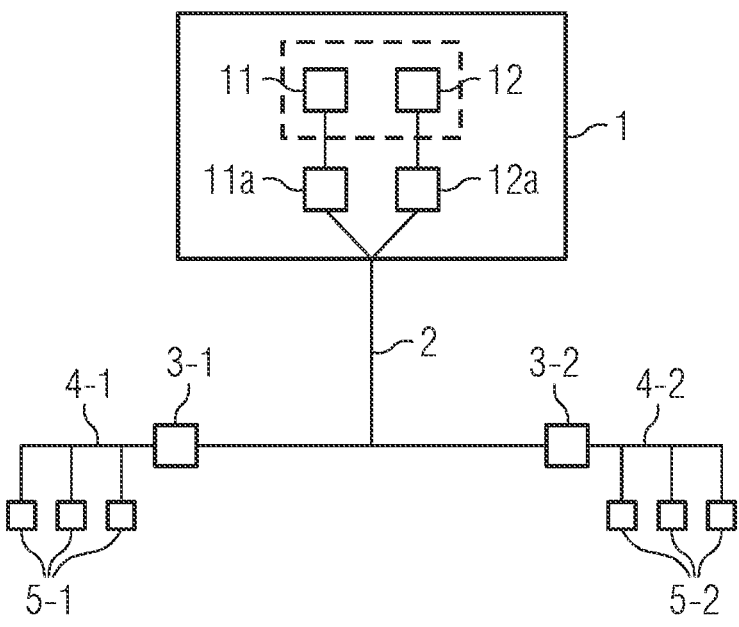
FIG. 5 schematically illustrates an automation system in accordance with a further embodiment.

FIG. 5 shows a schematic diagram illustrating an automation system in accordance with a further embodiment. The embodiment of FIG. 5 differs from the previously described embodiment of an automation system in particular in that the modification or signing of the data telegrams according to the device-specific identifier is not performed within the control processes 11, 12 in the control apparatus 1. Rather, separate, externalized processes 11*a* and 12*a* are provided in the control apparatus 1 that sign the data telegrams in accordance with the device-specific identifiers or verify the signatures in accordance with the device-specific identifiers in a manner similar to the operations of the apparatus 3. This can be implemented, for example, via "sidecar containers".

Figure 6:
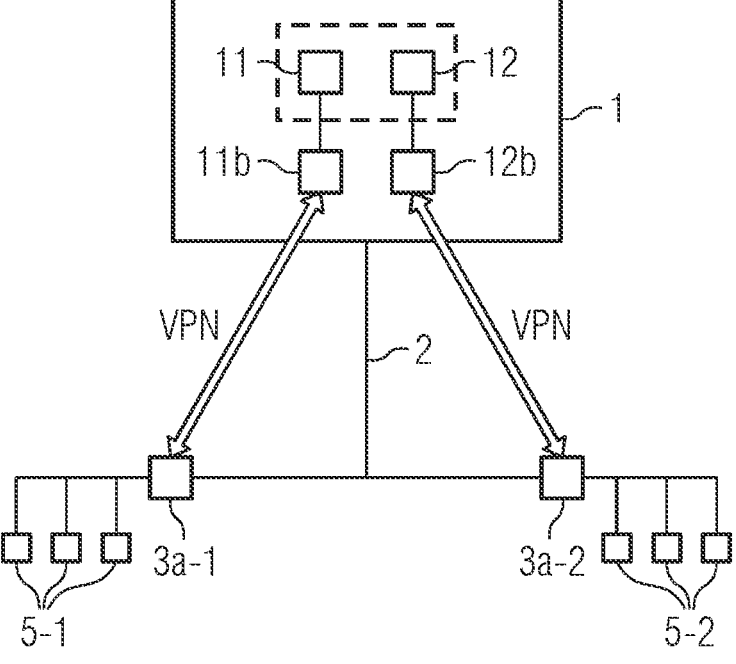
FIG. 6 schematically illustrates an automation system in accordance with yet another embodiment.

FIG. 6 shows a schematic representation of an automation system in accordance with yet another embodiment. This embodiment differs from the previously described embodiment in particular in that the data telegrams are generated within the control processes 11, 12 in accordance with the device-specific identifiers. The data telegrams are then processed in separate, externalized process modules 11*b*, 12*b* in the same way as previously described in connection with the operations of the apparatus 3 for coupling a device network to a communication network. The data telegrams modified in this way are then transmitted to apparatuses 3*a*-1, 3*a*-2 via protected, preferably encrypted connections within the communication network 2. Similarly, data telegrams from the automation devices 5-1, 5-2 can be received by these apparatuses via the protected connections within the communication network 2.

This makes it possible, on the one hand, to operate the control processes 11, 12 within the control apparatus 1 based on data telegrams in accordance with the device-specific identifiers, while, on the other hand, no operations whatsoever need to be performed outside the control apparatus 1 based on the device-specific identifiers. Here, the secure assignment of the addressing is ensured by the special protected, preferably encrypted connections. The conversion of the data telegrams between data telegrams with signatures based on a device-specific identifier and data telegrams without such a signature is already performed in the control apparatus 1. As a result, only the radio quality for a protected data connection to the control apparatus 1 needs to be implemented in the apparatuses 3 between the device networks and the communication network. This can be implemented, for example, based on a virtual private network (VPN) or similar.

Figure 7:
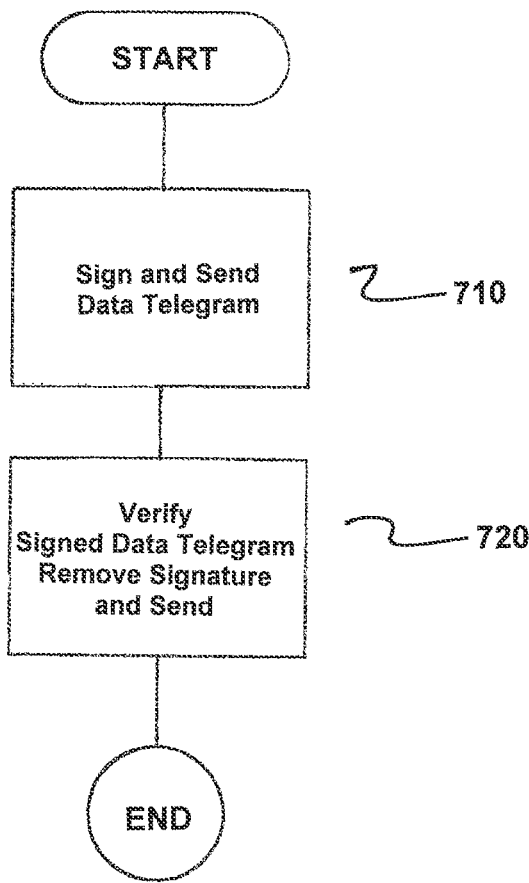
FIG. 7 is a flowchart of the method in accordance with the invention.

FIG. 7 is a flowchart of the method for coupling a device network 4-1, 4-2 to at least one automation device 5-1, 5-2 and for coupling a communication network 2 to a control apparatus 1 for the at least one automation device 5-1, 5-2.

The method comprises signing a data telegram from the device network 4-1, 4-2 with a device-specific identifier and sending the signed data telegram to the control apparatus 1 via the communication network 2, as indicated in step 710.

Next, the signed data telegram received by the control apparatus 1 is verified via the communication network 2 utilizing the device-specific identifier, a signature of the signed data telegram is removed and the data telegram is sent without the signature to an automation device 5-1, 5-2 in the device network 4-1, 4-2, as indicated in step 720.

In accordance with the method, the device-specific identifier comprises a predetermined identifier of the source device 5-1, 5-2 or the destination device 5-1, in the device network 4-1, 4-2.

In summary, the present invention relates to a system for verifying the addressing of components in an automation system having a hyper-convergent infrastructure. In particular, a gateway is proposed which can extend data telegrams to include a device-specific signature if such a signature cannot be implemented by the automation device of the automation system itself.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An apparatus for coupling a device network to at least one automation device and a communication network to a control apparatus for the at least one automation device, the apparatus comprising:

a first interface configured to be coupled to the device network;

a second interface configured to be coupled to the communication network; and a processing facility configured to sign a data telegram from an automation device in the device network with a device-specific identifier and configured to send the signed data telegram to the control apparatus via the communication network, and configured to verify a signed data telegram from the control apparatus utilizing a device-specific identifier, to remove a signature of the signed data telegram, and to send the data telegram without the signature to an automation device in the device network;

wherein the device-specific identifier comprises a predetermined identifier of a source device or destination device in the device network; and wherein the signing of a data telegram from the device network and the removal of the signature of a data telegram from the communication network involves an XOR operation between a predetermined data field and the device-specific identifier.

2. The apparatus as claimed in claim 1, further comprising:

a memory facility which stores and provides predetermined device-specific identifiers for automation devices in the device network.

3. The apparatus as claimed in claim 2, wherein the processing facility is configured to forward already signed data telegrams unchanged from the device network via the communication network to the control apparatus and to forward signed data telegrams unchanged to an automation device in the device network if the corresponding automation device is configured to process signed data telegrams.

4. The apparatus as claimed in claim 1, wherein the processing facility is configured to forward already signed data telegrams unchanged from the device network via the communication network to the control apparatus and to forward signed data telegrams unchanged to an automation device in the device network if the corresponding automation device is configured to process signed data telegrams.

5. The apparatus as claimed in claim 1, wherein the processing facility is configured to encrypt a signed data message before the signed data message is sent to the control apparatus via the communication network and to decrypt encrypted data message from the control apparatus.

6. The apparatus as claimed in claim 1, wherein the data telegrams comprise telegrams of a communication protocol in accordance with International Electrotechnical Commission (IEC) standard 61784-3.

7. An automation system, comprising:

a plurality of groups of automation devices, automation devices of a group of automation devices each being interconnected via a separate device network;

a control apparatus configured to execute a plurality of control processes for automation devices on a common hardware, a control process being provided for each of the automation devices of the group of automation devices;

a plurality of apparatuses for coupling a device network to a communication network as claimed in claim 1;

wherein an apparatus for coupling a device network to a communication network couples each device network of the group of automation devices to a communication network; and wherein the control apparatus is connected to the plurality of apparatuses for coupling a device network to a communication network via a common communication network.

8. An automation system, comprising:

a plurality of groups of automation devices, the automation devices of the group of automation devices each being interconnected via a separate device network;

a control apparatus configured to execute a plurality of control processes for automation devices on a common hardware, a control process being provided for each of the automation devices of the group of automation devices, and a processing instance being additionally provided in the control apparatus for each control process, each processing instance being configured to sign a data telegram from an automation device with a device-specific identifier and being configured to forward the signed data telegram to the corresponding control process, and to check a signed data telegram from a control process using a device-specific identifier, to remove the signature of the signed data telegram and to output the data telegram without the signature;

a plurality of apparatuses for coupling a device network to a control apparatus, each of the apparatuses for coupling the device network to a control apparatus being configured to establish a secure connection in a communication network with a processing instance of the control apparatus and to exchange data telegrams between the respective device network and the corresponding processing instance of the control apparatus via the secure connection;

wherein the signing of a data telegram from the device network and the removal of the signature of a data telegram from the communication network involves an XOR operation between a predetermined data field and the device-specific identifier.

9. A method for coupling a device network to at least one automation device and for coupling a communication network to a control apparatus for the at least one automation device, the method comprising:

signing a data telegram from the device network with a device-specific identifier and sending the signed data telegram to the control apparatus via the communication network; and verifying the signed data telegram received by the control apparatus via the communication network utilizing the device-specific identifier, and removing a signature of the signed data telegram and sending the data telegram without the signature to an automation device in the device network;

wherein the device-specific identifier comprises a predetermined identifier of the source device or the destination device in the device network;

wherein the signing of a data telegram from the device network and the removal of the signature of a data telegram from the communication network involves an XOR operation between a predetermined data field and the device-specific identifier.

10. The method as claimed in claim 9, wherein a data telegram is sent to the automation device in the device network only if signature verification was successful.

* * * * *